US006342557B1

(12) United States Patent
Suzuki et al.

(10) Patent No.: US 6,342,557 B1
(45) Date of Patent: Jan. 29, 2002

(54) RESIN COMPOSITION AND MOLDED OR FORMED PRODUCT

(75) Inventors: Keiichiro Suzuki; Masahito Tada, both of Fukushima (JP)

(73) Assignee: Kureha Kagaku Kogyo K.K., Toyota (JP)

( * ) Notice: Subject to any disclaimer, the term of this patent is extended or adjusted under 35 U.S.C. 154(b) by 0 days.

(21) Appl. No.: 09/389,902

(22) Filed: Sep. 3, 1999

(30) Foreign Application Priority Data

Sep. 7, 1998 (JP) .......................................... 10-268932

(51) Int. Cl.[7] .................................................. C08K 3/32

(52) U.S. Cl. ......................... 524/432; 524/431; 252/55; 252/56

(58) Field of Search ................................ 524/413, 431, 524/432, 435, 436, 494, 502, 503, 609, 423; 252/62.54, 62.55, 62.56, 62.64

(56) References Cited

U.S. PATENT DOCUMENTS

| | | | | | |
|---|---|---|---|---|---|
| 3,514,405 | A | | 5/1970 | Rabl et al. | |
| 3,598,993 | A | * | 8/1971 | Kaufer et al. | 250/65 T |
| 3,951,799 | A | * | 4/1976 | Weiss et al. | 210/75 |
| 3,996,392 | A | * | 12/1976 | Berg et al. | 427/19 |
| 4,308,155 | A | * | 12/1981 | Tada et al. | 252/62.54 |
| 5,435,929 | A | * | 7/1995 | Tada et al. | 252/62.54 |
| 5,518,641 | A | * | 5/1996 | Inuzuka et al. | 252/62.56 |
| 5,645,774 | A | * | 7/1997 | Reczek et al. | 264/40.1 |
| 5,650,459 | A | * | 7/1997 | Satake et al. | 524/396 |
| 6,037,400 | A | * | 3/2000 | Kitahata et al. | 524/495 |

FOREIGN PATENT DOCUMENTS

| | | |
|---|---|---|
| GB | 2001950 | 2/1979 |
| JP | 8-148322 | 6/1996 |

* cited by examiner

*Primary Examiner*—Edward J. Cain
*Assistant Examiner*—Katarzyna Lee Wyrozebski
(74) *Attorney, Agent, or Firm*—Dinsmore & Shohl LLP

(57) ABSTRACT

A resin composition comprising a synthetic resin and a powdered magnetic material, wherein (1) the powdered magnetic material is soft ferrite powder having a rate of permeability change by temperature ranging from −0.040 to 0.010%/° C. in a temperature range of from 20° C. to 80° C. and an average particle diameter ranging from 2 to 1,000 μm, and (2) the powdered magnetic material is contained in a proportion of 50 to 1,400 parts by weight per 100 parts by weight of the synthetic resin, and a molded or formed product which is formed from the resin composition and exhibits a permeability stable to changes in environmental temperature.

10 Claims, No Drawings

RESIN COMPOSITION AND MOLDED OR FORMED PRODUCT

FIELD OF THE INVENTION

The present invention relates to a resin composition comprising a synthetic resin and a powdered magnetic material, and particularly to a resin composition which comprises, as a powdered magnetic material, soft ferrite powder having a low rate of permeability change by temperature and can be suitably used in a field of filters such as duplexers and multiplexers, and a molded or formed product from such a resin composition.

BACKGROUND OF THE INVENTION

Compounds ($MO \cdot Fe_2O_3$) composed of ferric oxide and an oxide of a divalent metal are soft magnetic materials exhibiting a high permeability and generally called soft ferrite. Sinter molded or formed products from soft ferrite such as Ni—Zn ferrite, Mg—Zn ferrite or Mn—Zn ferrite are widely used as, for example, magnetic cores for radios, televisions, communication equipment, OA apparatus, inductors for switching power sources and the like, transformers, filters, etc.; head cores for video or image apparatus and magnetic disk apparatus; and the like.

In recent years, composite materials (resin compositions) obtained by dispersing a powdered magnetic material in a polymer have attracted attention as new magnetic materials, since they can be formed into molded or formed products of desired shapes and sizes by melt processing processes such as injection molding, extrusion and compression molding. Resin compositions making use of soft ferrite powder as a powdered magnetic material have also been proposed. However, the soft ferrite powder tends to undergo changes in its magnetic properties, for example, reduction in effective permeability by the formation of its composite with a synthetic resin. Therefore, the application fields of the resin compositions comprising the synthetic resin and soft ferrite powder are limited under the circumstances to choke coils, rotary transformers, electromagnetic wave shielding materials, etc.

Investigations have heretofore been made to apply resin compositions comprising a synthetic resin and soft ferrite powder to an application field of noise filters. A filter has a function that an electric current within a certain frequency band is caused to pass through, and great attenuation is given to electric currents within other frequency bands than that frequency band. Such a resin composition may be used as a various kinds of noise filters that suppress noises in a wide frequency band. Since the resin composition has a too high rate of permeability change by temperature, however, it has involved a problem that in a field of filters such as duplexers and multiplexers that perform a separation of a specific frequency band, or the like, the frequency band to be separated varies due to changes in environmental temperature, resulting in a failure to use it.

More specifically, in the conventional resin compositions making use of soft ferrite powder, the rate of permeability change by temperature amounts to higher than 0.025%/° C. or lower than −0.025%/° C. in a temperature range of from 20° C. to 80° C. Therefore, the inductance of an electronic part making use of a molded or formed product (hereinafter may be referred to as "molded product" merely) from such a resin composition greatly varies according to changes in environmental temperature. When the inductance greatly varies, a frequency band to be separated changes, and so the electronic part has been unable to be used as an electronic part for separating a specific frequency, such as a duplexer or multiplexer.

OBJECTS AND SUMMARY OF THE INVENTION

It is an object of the present invention to provide a resin composition which comprises a synthetic resin and a powdered magnetic material, has an extremely low rate of permeability change by temperature and can be applied to an application field of filters which separate a specific frequency, such as duplexers and multiplexers.

Another object of the present invention is to provide a molded product from such a resin composition.

The present inventors have carried out an extensive investigation with a view toward overcoming the above-described problems involved in the prior art. As a result, it has been found that soft ferrite powder having a rate of permeability change by temperature ranging from −0.040 to 0.010%/° C. in a temperature range of from 20° C. to 80° C. is used as a powdered magnetic material in combination with a synthetic resin, whereby the rate of permeability change by temperature of a molded product from a resin composition comprising the synthetic resin and the powdered magnetic material can be lowered within a range of ±0.025%/° C., preferably ±0020%/° C. It has also been found that when the average particle diameter and blending proportion of the soft ferrite powder are selected within respective specific ranges, a resin composition well balanced between magnetic properties such as permeability, and the molding and processing ability can be provided. The present invention has been led to completion on the basis of these findings.

According to the present invention, there is thus provided a resin composition comprising a synthetic resin and a powdered magnetic material, wherein:

(1) the powdered magnetic material is soft ferrite powder having a rate of permeability change by temperature ranging from −0.040 to 0.010%/° C. in a temperature range of from 20° C. to 80° C. and an average particle diameter ranging from 2 to 1,000 $\mu$m, and (2) the powdered magnetic material is contained in a proportion of 50 to 1,400 parts by weight per 100 parts by weight of the synthetic resin.

According to the present invention, there is also provided a molded or formed product obtained by molding or forming the resin composition.

DETAILED DESCRIPTION OF THE INVENTION

Soft Ferrite Powder:

No particular limitation is imposed on the composition and production process of the soft ferrite powder useful in the practice of the present invention so far as it is soft ferrite powder having a rate of permeability change by temperature ranging from −0.040 to 0.010%/° C. in a temperature range of from 20° C. to 80° C. and an average particle diameter ranging from 2 to 1,000 $\mu$m.

The soft ferrite is generally a compound ($MO \cdot Fe_2O_3$) composed of ferric oxide ($Fe_2O_3$) and an oxide (MO) of a divalent metal. Examples of M include Ni, Mn, Co, Cu, Zn, Mg and Cd. Among various kinds of soft ferrite, soft ferrite having a composition represented by the general formula, $(XO)_x(ZnO)yFe_2O_3$ is preferred. In the general formula, X means one or more of divalent metals such as Ni, Cu, Mg, Co and Mn. x and y denote a compositional ratio (molar ratio) of XO to ZnO. A molar ratio of $(XO)_x(ZnO)_y$(=x+y) to $Fe_2O_3$ is generally about 0.3:0.7 to 0.7:0.3, preferably about 0.4:0.6 to 0.6:0.4. Examples of such soft ferrite include Ni—Zn ferrite, Mg—Zn ferrite and Mn—Zn ferrite.

In order to improve the permeability and the like of the soft ferrite used in the present invention, a small amount of additives, for example, $SiO_2$, PbO, $PbO_2$, $As_2O_3$, $V_2O_5$ and the like, may be added to the soft ferrite in the course of the preparation thereof. In the soft ferrite, it is also preferred to control the content of an iron oxide in order to suppress the deposition of hematite.

The soft ferrite powder used in the present invention can be obtained in accordance with the publicly known process such as the dry process, co-precipitation process or atomization and thermal decomposition process. Main raw materials of the soft ferrite are, for example, metal oxides such as $Fe_2O_3$, NiO, $MnO_2$, ZnO, MgO, CuO, etc. and/or metal carbonates. In the dry process, the raw materials such as the metal oxides and/or the metal carbonates are mixed with each other with their blending proportions calculated so as to give a prescribed blending ratio, fired and then ground. In this dry process, it is preferred that the raw mixture be calcined at a temperature of 850 to 1,100° C. and ground into fine particles and then granulated into granules, and the granules be further really fired and ground again to give soft ferrite powder having a desired average particle diameter. However, the raw mixture may be directly fired without calcining it. In the co-precipitation process, a strong alkali is added to an aqueous solution of metal salts to precipitate hydroxides, and the hydroxides are oxidized to give soft ferrite powder. In the atomization and thermal decomposition process, an aqueous solution of metal salts is subjected to thermal decomposition to give finely particulate oxides. In either the co-precipitation process or the atomization and thermal decomposition process, it is desired that a step of really firing be added after the granulation. Incidentally, the raw mixture may be really fired after calcination or directly.

Examples of a method for controlling the rate of permeability change by temperature of the soft ferrite powder low include ① a method in which a proportion of ZnO is made low, ② a method in which the kinds and amounts of additives to be used are adjusted, ③ a method in which a firing temperature is adjusted, and ④ combinations of these methods. The content of ZnO (or Zn component in ferrite) is made low, whereby the rate of permeability change by temperature of the resulting soft ferrite can be lowered. However, the permeability of the soft ferrite becomes lowered. On the other hand, when additives such as $SiO_2$, PbO and $PbO_2$ are added, the permeability of the resulting soft ferrite can be raised. Accordingly, when the content of ZnO, and the kinds and contents of the additives are adjusted, the rate of permeability change by temperature can be lowered while retaining a high permeability. For example, in the case where x+y in the above-described general formula is equal to 1, the rate of permeability change by temperature in a temperature range of from 20° C. to 80° C. can be lowered by controlling the proportion of y low to an extent of $y \leqq$ about 0.4, preferably $y \leqq$ about 0.3. The content of ZnO (or Zn component in ferrite) may be controlled to 20 mol % or lower, preferably 15 mol % or lower based on the whole composition of the soft ferrite. In this case, the lower limit of the content of ZnO is about 2 mol %. On the other hand, the proportions of the additives such as $SiO_2$, PbO, $PbO_2$, $As_2O_3$ and $V_2O_5$ are controlled within a range of about 5 to 15 wt. % in total, whereby the lowering of permeability can be prevented. In the case of Ni—Zn ferrite, CuO is added in a small amount of about 0.5 to 3 wt. %, whereby the permeability can be raised like the above-described additives. However, it is preferred that the permeability be not very overraised in the case where the ferrite is used at high frequency.

The firing temperature varies according to the kind and composition of soft ferrite used. However, it is generally about 1,000 to 1,350° C. The selection of this firing temperature permits lowering the rate of permeability change by temperature while retaining a moderate permeability. In order to improve magnetic properties of the resulting soft ferrite, it is preferred that such additives as described above be added, and the firing temperature be controlled at 1,050° C. or higher.

In the present invention, after the firing step, the fired product (sintered material) may be ground into powder by any known method for the purpose of providing the intended soft ferrite powder. For example, a method, in which the sintered material is ground by a hammer mill, rod mill, ball mill or the like into powder having the intended particle diameter, may be used.

The average particle diameter of the soft ferrite used in the present invention is within a range of 2 to 1,000 $\mu$m. If the average particle diameter of the soft ferrite powder is too great or small, the molding and processing ability of the resulting resin composition, such as injection molding or extrusion, is deteriorated. In particular, if the average particle diameter of the soft ferrite powder is too great, the abrasion of a molding or forming machine is allowed to extremely proceed, and so the molding or forming of the resulting resin composition becomes difficult. If the average particle diameter of the soft ferrite powder is too small, it is difficult to achieve a sufficient permeability in the resin composition. The average particle diameter of the soft ferrite powder is preferably about 2 to 500 $\mu$m, more preferably about 3 to 350 $\mu$m.

The rate of permeability change by temperature in a temperature range of from 20° C. to 80° C. of the soft ferrite powder according to the present invention is within a range of −0.040 to 0.010%/° C. The use of the soft ferrite powder having such a low rate of permeability change by temperature permits the provision of molded products low in rate of permeability change by temperature in a temperature range of from 20° C. to 80° C. and suitable for use in filters such as duplexers and multiplexers. The rate of permeability change by temperature in a temperature range of from 20° C. to 80° C. of the soft ferrite powder according to the present invention is preferably within a range of −0.035 to 0.008%/° C., more preferably −0.030 to 0.005%/° C. In many cases, the upper limit thereof is 0.000%/° C.

Resin Composition:

Examples of the synthetic resin useful in the practice of the present invention include polyolefins such as polyethylene, polypropylene, ethylene-vinyl acetate copolymers and ionomers; polyamides such as nylon 6, nylon 66, nylon 6/66, nylon 46 and nylon 12; poly(arylene sulfides) such as poly(phenylene sulfide), poly(phenylene sulfide ketone) and poly(phenylene sulfide sulfone); polyesters such as polyethylene terephthalate, polybutylene terephthalate and overall aromatic polyesters; polyimide resins such as polyimide, polyether imide and polyamide-imide; styrene resins such as polystyrene and acrylonitrile-styrene copolymers; chlorine-containing vinyl resins such as polyvinyl chloride, polyvinylidene chloride, vinyl chloride-vinylidene chloride copolymers and chlorinated polyethylene; poly(meth)acrylates such as polymethyl acrylate and polymethyl methacrylate; acrylonitrile resins such as polyacrylonitrile and polymethacrylo-nitrile; thermoplastic fluorocarbon resins such as tetrafluoroethylene/perfluoroalkyl vinyl ether copolymers, polytetrafluoroethylene, tetrafluoro-ethylene/hexafluoropropylene copolymers and polyvinylidene fluoride; silicone resins such as dimethyl polysiloxane; various kinds of engineering plastics such as polyphenylene oxide, poly(ether ether ketone), poly(ether ketone), polyallylate, polysulfone and poly(ether sulfone); various kinds of thermoplastic resins such as polyacetal, polycarbonate, polyvinyl acetate, polyvinyl formal, polyvinyl butyral, polybutylene, polyisobutylene, polymethylpentene, butadiene resins, polyethylene oxide, oxybenzoyl polyester and poly-p-xylene; thermosetting resins such as epoxy resins, phenol resins and unsaturated polyester resins; elastomers such as ethylene-propylene rubber, polybutadiene rubber, styrene-butadiene rubber and chloroprene rubber; thermoplastic elastomers such as styrene-butadiene-styrene block copolymers; etc.

These synthetic resins may be used either singly or in any combination thereof. Of these synthetic resins, polyolefins such as polyethylene and polypropylene, polyamides, and poly(arylene sulfides) such as poly(phenylene sulfide) are particularly preferred from the viewpoint of moldability. From the viewpoints of moldability, heat resistance, etc., poly(arylene sulfides) and polyamides are particularly preferred.

The resin compositions according to the present invention comprise the powdered magnetic material (soft ferrite powder) in a proportion of 50 to 1,400 parts by weight per 100 parts by weight of the synthetic resin. If the blending proportion of the powdered magnetic material is too low, it is difficult to provide a resin composition and a molded product which have a permeability fit for the purpose of use. If the blending proportion of the powdered magnetic material is too high, the flowability of the resulting resin composition is deteriorated, resulting in the difficulty of conducting melt processing such as injection molding or extrusion. The blending proportion of the powdered magnetic material is preferably 70 to 1,300 parts by weight, more preferably 80 to 1,200 parts by weight.

In a resin composition comprising a synthetic resin and a powdered magnetic material, soft ferrite powder having a rate of permeability change by temperature ranging from −0.040 to 0.010%/° C. in a temperature range of from 20° C. to 80° C. is used as the powdered magnetic material, whereby the rate of permeability change by temperature in a temperature range of from 20° C. to 80° C. of a molded product obtained from such a resin composition can be controlled within a range of ±0.025%/° C. If the rate of permeability change of the soft ferrite used exceeds 0.010%/° C., the rate of permeability change by temperature of the molded product generally comes to exceed 0.025%/° C. If the rate of permeability change of the soft ferrite used is lower than −0.040%/° C. on the other hand, the rate of permeability change by temperature of the molded product generally becomes lower than −0.025%/° C. When such a resin composition having a high rate of permeability change by temperature is used to produce a filter such as a duplexer or multiplexer, the inductance thereof greatly varies according to changes in environmental temperature, and so a frequency band to be separated changes. Therefore, such a filter comes to be lacking in practicability.

The permeability of a molded product from the resin composition according to the present invention varies according to the permeability and blending proportion of the soft ferrite powder. However, it is generally at least 1.5, preferably at least 1.7. In many cases, the permeability may be controlled to at least 2.0. If the permeability of the molded product is too low, the molded product becomes unsuitable for use in a filter.

Various kinds of fillers such as fibrous fillers, plate-like fillers and spherical fillers may be incorporated into the resin compositions according to the present invention with a view toward improving their mechanical properties, heat resistance and the like. Among these fillers, the fibrous filler such as glass fiber is preferred from the viewpoint of enhancing mechanical strength. No particular limitation is imposed on the blending proportion of the filler. However, it is generally 100 parts by weight or lower, preferably 50 parts by weight or lower, per 100 parts by weight of the synthetic resin. The blending of the filler is optional, and the lower limit of the blending proportion thereof is 0 part by weight. If blended, however, it is desirable that the blending proportion be controlled to generally at least 5 parts by weight, preferably at least 10 parts by weight, per 100 parts by weight of the synthetic resin.

Various kinds of additives such as flame retardants, antioxidants and colorants may also be incorporated into the resin compositions according to the present invention as needed.

The resin compositions according to the present invention can be produced by uniformly mixing the respective components. For example, the respective prescribed amounts of the powdered magnetic material, the synthetic resin, and the various kinds of additives if desired are mixed by a mixer such as a Henschel mixer, and the mixture is melted and kneaded, whereby a resin composition can be produced.

The resin compositions according to the present invention can be formed into molded or formed products of desired shapes by various kinds of molding or forming processes such as injection molding, extrusion and compression molding. Since the resin compositions according to the present invention can be molded or formed by such various kinds of melt processing techniques, molded products of complex shapes, small-sized molded products and the like may be formed with ease. No particular limitation is imposed on the kind of a molded product from the resin composition. However, the resin composition is preferably formed into a molded product (for example, a magnetic core) suitable for use in a filter such as a duplexer or multiplexer, since its rate of permeability change by temperature is extremely low.

EMBODIMENTS OF THE INVENTION

The present invention will hereinafter be described more specifically by the following Examples and Comparative Examples. However, the present invention is not limited to these examples only.

Physical properties in the examples were measured in accordance with the following respective methods:

(1) Rate of permeability change by temperature of powdered magnetic material:

Each powdered magnetic material sample was packed in a hermetically sealed glass tube having a diameter of about 6 mm, and the glass tube was wound with 50 turns of a polyurethane-coated conductor having a diameter of 0.3 mm to form a coil. With respect to this coil, the inductance at a frequency of 100 kHz was measured at respective temperatures of 20° C. and 80° C. by means of an LCR meter (4192A manufactured by Hewlett Packard Co.). The rate of permeability change by temperature of the sample was calculated out in accordance with the following equations ① to ③:

① $L_{80}$=inductance at 80° C.;

② $L_{20}$=inductance at 20° C.; and

③ Rate of permeability change by temperature (%/° C.)=$[(L_{80}-L_{20})/L_{20}]/60\times100$ (2) Permeability of molded product and its rate of permeability change by temperature:

The permeability of each molded product sample was measured in accordance with JIS C 2561. The rate of permeability change by temperature of the molded product sample was determined in the following manner. Namely, a troidal core having an outer diameter of about 13 mm, an inner diameter of 7.5 mm and a thickness of 5 mm was made by molding to use a sample. This sample was wound with 60 turns of a polyurethane-coated conductor having a diameter of 0.3 mm to form a coil. With respect to this coil, the inductance at a frequency of 100 kHz was measured at respective temperatures of 20° C. and 80° C. by means of the LCR meter (4192A manufactured by Hewlett Packard Co.) in accordance with JIS C 2561. The rate of permeability change by temperature of the molded troidal core sample was calculated out using the above-described equations ① to ③.

(3) Average particle diameter of powdered magnetic material:

Each powdered magnetic material sample was taken out twice by a microspatula and placed in a beaker. After 1 or 2 drops of an anionic surfactant (SN Dispersat 5468) were added thereto, the sample was kneaded by a rod having a round tip so as not to crush the powdered sample. The thus-prepared sample was used to determine an average particle diameter by means of a Microtrack FRA particle diameter analyzer 9220 model manufactured by Nikkiso Co., Ltd.

EXAMPLE 1

NiO (22.0 wt. %), ZnO (4.1 wt. %), CuO (1.3 wt. %), $Fe_2O_3$ (59.2 wt. %), $SiO_2$ (0.5 wt. %) and $PbO_2$ (12.9 wt. %) were weighed, ground by a steel ball mill making use of a water as a dispersing medium and then mixed with one another. The mixture was dried and then calcined at a temperature of about 1,000° C. to prepare a ferrite compound. After the calcined ferrite compound was ground, a lubricant was added thereto, and the resultant mixture was granulated into granules by means of a spray drier in accordance with a method known per se in the art. The granules were fired at 1,150° C. for about 2 hours to give a sintered material. This sintered material was ground by a hammer mill to obtain Ni—Zn ferrite powder having an average particle diameter of 30 μm. The rate of permeability change by temperature of this Ni—Zn ferrite powder was determined and found to be −0.0045 (%/° C.).

The Ni—Zn ferrite powder (5 kg) obtained above, poly (phenylene sulfide) (2.5 kg; product of Kureha Kagaku Kogyo K.K.; melt viscosity measured at 310° C. and a shear rate of 1,000 $sec^{-1}$=about 20 Pa·s), and glass fiber (0.8 kg; chopped glass strand ECS03T-717G; product of Nippon Electric Glass Co., Ltd.) were weighed and mixed with one another in a 20-liter Henschel mixer. The composition of the mixture is such that proportions of the glass fiber and the Ni—Zn ferrite powder are 32 parts by weight and 200 parts by weight, respectively, per 100 parts by weight of the poly(phenylene sulfide). The resultant mixture was fed to a twin-screw extruder preset at 280 to 330° C. and melted and kneaded to form pellets.

The pellets thus obtained were fed to an injection molding machine (PS-10E manufactured by Nissei Plastic Industrial Co., Ltd.) and injection-molded at a cylinder temperature of 280 to 310° C., an injection pressure of about 1,000 $kgf/cm^2$ and a mold temperature of about 160° C., thereby making a molded troidal core having an outer diameter of 12.8 mm, an inner diameter of 7.6 mm and a thickness of 4.9 mm. The molded troidal core thus obtained was used to determine its rate of permeability change by temperature. As a result, it was 0.01 (%/° C.). The formulation and results are shown in Table 1. The above-described pellets were used to make a duplexer. As a result, the duplexer was found to exhibit high stability to temperature change, be capable of separating a specific frequency and have sufficient practicability.

EXAMPLES 2 TO 7, AND COMPARATIVE EXAMPLES 1 TO 6

Various kinds of Ni—Zn ferrite powder different in rate of permeability change by temperature and/or average particle diameter from one another as shown in Tables 1 and 2 were made by varying the firing temperature between 1,000 and 1,350° C. and/or changing the conditions of grinding by the hammer mill in Example 1.

The respective Ni—Zn ferrite powders thus obtained were used to prepare compositions (pellets) having their corresponding formulations shown in Tables 1 and 2 and molded troidal cores in a similar manner to Example 1. The formulations and evaluation results are shown in Tables 1 and 2. Nylon 6 used in Example 6 and Comparative Example 5 is P1011 (trade name, product of Ube Industries, Ltd.).

TABLE 1

| | Ex. 1 | Ex. 2 | Ex. 3 | Ex. 4 | Ex. 5 | Ex. 6 | Ex. 7 |
|---|---|---|---|---|---|---|---|
| Composition<br>Synthetic resin (wt. %) | | | | | | | |
| PPS | 30.1 | 30.1 | 30.1 | 30.1 | 30.1 | — | 50.0 |
| Nylon 6 | — | — | — | — | — | 7.8 | — |
| Filler (wt. %) | | | | | | | |
| Glass fiber | 9.6 | 9.6 | 9.6 | 9.6 | 9.6 | — | 9.1 |
| Powdered magnetic material (wt. %) | | | | | | | |
| Ferrite powder | 60.2 | 60.2 | 60.2 | 60.2 | 60.2 | 92.2 | 40.9 |
| Properties of ferrite powder | | | | | | | |
| Average particle diameter (μm) | 30 | 4 | 250 | 30 | 30 | 30 | 30 |
| Rate of permeability change by temperature (%/° C.) | −0.0045 | −0.005 | −0.0045 | 0.005 | −0.03 | −0.0045 | −0.0045 |

TABLE 1-continued

| | Ex. 1 | Ex. 2 | Ex. 3 | Ex. 4 | Ex. 5 | Ex. 6 | Ex. 7 |
|---|---|---|---|---|---|---|---|
| Properties of molded product | | | | | | | |
| Permeability | 2.3 | 2.1 | 2.7 | 2.3 | 2.3 | 4.9 | 1.7 |
| Rate of permeability change by temperature (%/° C.) | 0.01 | 0.009 | 0.01 | 0.02 | −0.018 | 0.017 | 0.004 |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Composition | Synthetic resin (wt. %) | | | | | | |
| | PPS | 30.1 | 30.1 | 30.1 | 30.1 | — | 63.6 |
| | Nylon 6 | — | — | — | — | 6.4 | — |
| | Filler (wt. %) | | | | | | |
| | Glass fiber | 9.6 | 9.6 | 9.6 | 9.6 | — | 9.1 |
| | Powdered magnetic material (wt. %) | 60.2 | 60.2 | 60.2 | 60.2 | 93.6 | 27.3 |
| | Ferrite powder | | | | | | |
| Properties of ferrite powder | | | | | | | |
| Average particle diameter (μm) | | 30 | 30 | 1 | 1200 | 30 | 30 |
| Rate of permeability change by temperature (%/° C.) | | 0.014 | −0.06 | −0.0045 | −0.0001 | −0.014 | −0.0045 |
| Properties of molded product | | | | | | | |
| Permeability | | 2.3 | 2.3 | Incapable of molding | Incapable of extruding | Incapable of extruding | 1.4 |
| Rate of permeability change by temperature (%/° C.) | | 0.028 | −0.03 | | | | Scant permeability |

(Note)
(1) PPS: Poly(phenylene sulfide) (product of Kureha Kagaku Kogyo K.K.; melt viscosity measured at 310° C. and a shear rate of 1,000 $sec^{-1}$: about 20 Pa.s);
(2) Glass fiber (chopped glass strand ECS03T-717G; product of Nippon Electric Glass Co., Ltd.)
(3) Nylon 6: P1011 made by Ube Industries, Ltd.

ADVANTAGES OF THE INVENTION

According to the present invention, there are provided resin compositions which each comprise a synthetic resin and soft ferrite powder and permit the provision of molded products having an extremely low rate of permeability change by temperature. In the molded products according to the present invention, the rates of permeability change by temperature thereof can be lowered within a range of ±0.025%/° C., and so they can be applied to an application field of filters which separate a specific frequency, such as duplexers and multiplexers of which high stability to changes in environmental temperature is required.

We claim:

1. A resin composition comprising a synthetic resin and a powdered magnetic material, wherein:

(1) the powdered magnetic material is soft ferrite powder having a rate of permeability change by temperature ranging from −0.040 to 0.010%/° C. in a temperature range of from 20° C. to 80° C. and an average particle diameter ranging from 2 to 1,000 μm, (2) the soft ferrite powder is Ni—Zn ferrite powder containing ZnO in an amount of 20 mol % or lower based on the composition of the soft ferrite, a CuO component in a proportion of 0.5 to 3 wt. %, and at least one additive component selected from the group consisting of $SiO_2$, PbO, $PbO_2$, $As_2O_3$ and $V_2O_5$ in a proportion of 5 to 15 wt. % in total, a (3) the powdered magnetic material is contained in a proportion of 50 to 1,400 parts by weight per 100 parts by weight of the synthetic resin.

2. The resin composition according to claim 1, wherein the rate of permeability change by temperature in a temperature range of from 20° C. to 80° C. of the soft ferrite powder is within a range of −0.035 to 0.008%/° C.

3. The resin composition according to claim 1, wherein the average particle diameter of the soft ferrite powder is within a range of 2 to 500 μm.

4. The resin composition according to claim 1, wherein the synthetic resin is at least one thermoplastic resin selected from the group consisting of poly(arylene sulfides), polyamides and polyolefins.

5. The resin composition according to claim 1, which further comprises a filler in a proportion of 100 parts by weight or lower per 100 parts by weight of the synthetic resin.

6. The resin composition according to claim 5, wherein the filler is glass fiber.

7. A molded or formed product obtained by molding or forming a resin composition comprising a synthetic resin and a powdered magnetic material, wherein:

(1) the powdered magnetic material is soft ferrite powder having a rate of permeability change by temperature ranging from −0.040 to 0.010%/° C. in a temperature range of from 20° C. to 80° C. and an average particle diameter ranging from 2 to 1,000 μm, (2) the soft ferrite powder is Ni—Zn ferrite powder containing ZnO in an amount of 20 mol % or lower based on the composition of the soft ferrite, a CuO component in a proportion of 0.5 to 3 wt. %, and at least one additive component selected from the group consisting of $SiO_2$, PbO, $PbO_2$, $As_2O_3$ and $V_2O_5$ in a proportion of 5 to 15 wt. % in total, and (3) the powdered magnetic material is contained in a proportion of 50 to 1,400 parts by weight per 100 parts by weight of the synthetic resin.

8. The molded or formed product according to claim 7, wherein the rate of permeability change by temperature in temperature range of from 20° C. to 80° C. of the molded or formed product is within a range of ±0.025%/° C.

9. The molded or formed product according to claim 7, wherein the permeability of the molded or formed product is at least 1.5.

10. The molded or formed product according to claim 7, which is a filter obtained by molding or forming the resin composition.

* * * * *

UNITED STATES PATENT AND TRADEMARK OFFICE

CERTIFICATE OF CORRECTION

PATENT NO. : 6,342,557 B1
DATED : January 29, 2002
INVENTOR(S) : Keiichiro Suzuki et al.

It is certified that error appears in the above-identified patent and that said Letters Patent is hereby corrected as shown below:

Column 9,
Line 67, change “total, a” to -- total, and --.

Signed and Sealed this

Eleventh Day of June, 2002

*Attest:*

JAMES E. ROGAN

*Attesting Officer*

*Director of the United States Patent and Trademark Office*